United States Patent [19]
Zacharias

[11] Patent Number: 4,649,754
[45] Date of Patent: Mar. 17, 1987

[54] HIGH PRESSURE TRANSDUCER

[75] Inventor: Ellis M. Zacharias, Tulsa, Okla.

[73] Assignee: Nusonics, Inc., Tulsa, Okla.

[21] Appl. No.: 702,349

[22] Filed: Feb. 15, 1985

Related U.S. Application Data

[63] Continuation-in-part of Ser. No. 464,416, Feb. 7, 1983, Pat. No. 4,505,160.

[51] Int. Cl.<sup>4</sup> .......................... H04R 17/00; G01F 1/66
[52] U.S. Cl. ................................. 73/861.18; 310/334; 310/336
[58] Field of Search ................. 73/861.18, 861.27, 632, 73/644; 310/327, 334, 336

[56] References Cited

U.S. PATENT DOCUMENTS

| | | | |
|---|---|---|---|
| Re. 29,785 | 9/1978 | Leschek et al. | 73/644 X |
| 3,771,117 | 11/1973 | Shaffer et al. | 73/861.27 X |
| 3,890,423 | 6/1975 | Zacharias, Jr. | 310/336 X |
| 3,973,152 | 8/1976 | Karplus | 310/327 |
| 4,162,111 | 7/1979 | Brown | 310/336 X |

Primary Examiner—Charles A. Ruehl
Attorney, Agent, or Firm—Head Johnson Stevenson

[57] ABSTRACT

A high pressure transducer for transmitting and/or receiving sonic energy, the transducer having a housing with a cylindrical opening, a metallic acoustic window element closing one end of the opening, a cylindrical transducer crystal having one planar surface in engagement with the acoustic window rearward face, a thrust producing compression screw threadably received in the cylindrical opening supplying pressure through dampening means to the crystal rearward face to force the crystal into intimate engagement with the acoustic window, the acoustic window having a thickness of about N times ½ of the wavelength of crystal produced sound in the acoustic window, N being the least whole number providing an acoustic window having strength to withstand the pressure to which the transducer is subjected without significant deformation.

21 Claims, 5 Drawing Figures

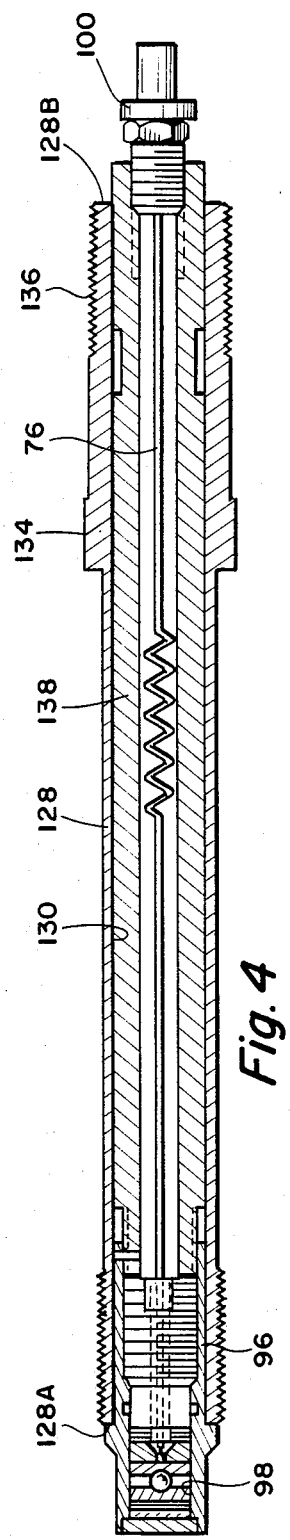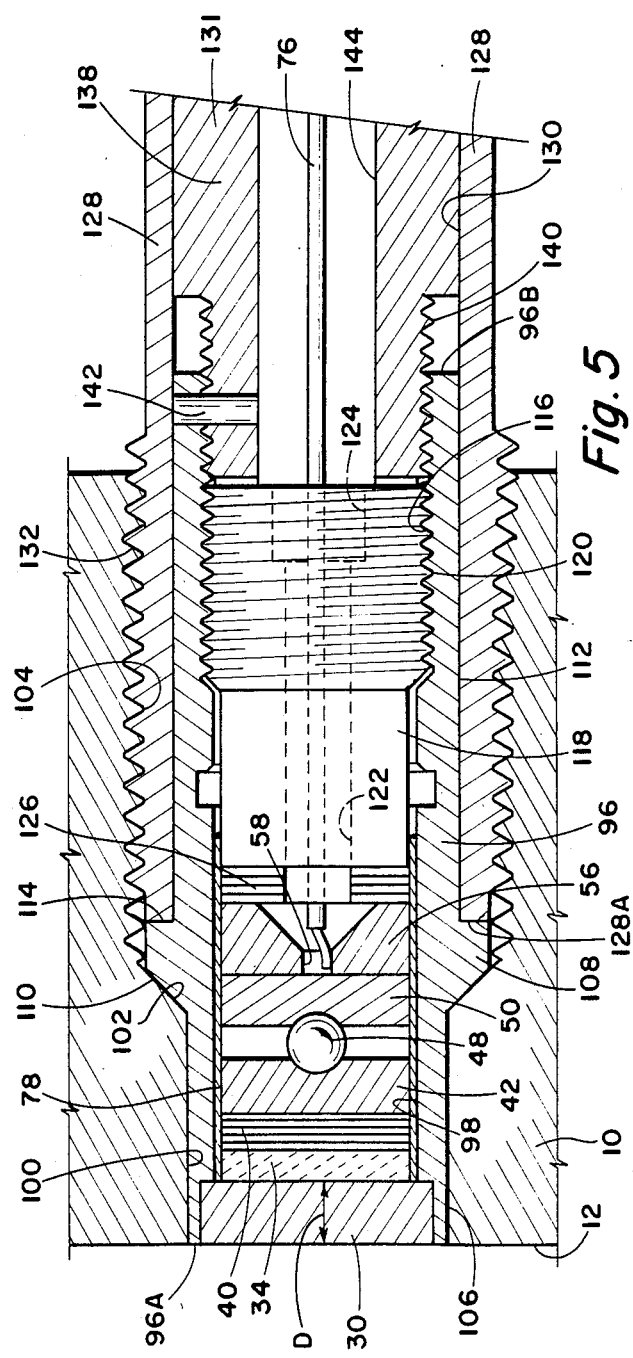

HIGH PRESSURE TRANSDUCER

CROSS-REFERENCE OF THE INVENTION

This is a continuation-in-part of U.S. patent application No. 464,416 filed Feb. 7, 1983 and entitled "High-Temperature Transducer", now U.S. Pat. No. 4,505,160.

SUMMARY OF THE INVENTION

The use of sonic transducers in industry is well known, such as in flow meters. A particular application of the use of sonic energy to which the present invention is directed is to monitor the properties of molten plastic material in an injection molding machine or extruder. For this purpose the transducer must be positioned so that the sonic energy emanating from the transducer is coupled directly to the molten plastic material. Transducers may be used singly wherein a reflective surface is provided so that the same transducer both transmits and receives sonic energy, or transducers may be arranged in pairs so that they talk to each other through the molten plastic material.

By transmitting and receiving sonic energy in molten plastic material, the characteristics of the molten plastic can be measured and departures from established norms can be expeditiously detected. The velocity of sound travel in the molten plastic is an indicator of the modulus of elasticity of the plastic if the density is known. In addition, by measurement of sound energy loss, that is, absorption or attenuation, characteristics of the molten plastic can be monitored.

One difficulty in using transducers in this application is that they must be exposed to extremely high temperatures and high pressures. A second problem with the application of transducers for this purpose is that they must be sealed effectively to prevent entrance of molten plastic material into the transducer, yet in a manner which does not employ elastomers or other type of gasket arrangements which would be destroyed by the high temperatures and high pressuring to which the transducers are subjected.

The transducer of this invention includes a housing having a cylindrical opening in it. Closing one end of the opening is a metallic acoustic window. In the preferred embodiment this window is welded into place, thereby preventing leakage of fluid or gases into the interior of the transducer. The metal acoustic window has a rearward surface within the tubular opening. In contact with this rearward surface is a cylindrical crystal, such as a piezoelectric element having a forward face and a rearward face. In order to achieve efficiency in the transmission of sonic energy from the crystal element to the acoustic window, the faces of these two elements must be in secure, intimate contact. Any deviation which causes gaps or low pressure areas of contact between the crystal element and the acoustic window will impair the effectiveness and efficiency of the transducer.

Rearwardly of the crystal element within the cylindrical opening is a dampening means which preferably is in the form of a plurality of cylindrical washers made of non-ferrous metal such as copper, brass, or the like. Rearwardly of the absorption member are elements whose function it is to apply pressure against the absorption member and thereby the crystal to ensure intimate contact between the crystal and the acoustic window. In the present invention these elements include a first cylindrical thrust imparting disc which engages the adsorption member and a second thrust imparting disc. Each of the thrust imparting discs has a small depth recess in one end surface coincident with the cylindrical axis. A thrust imparting sphere is positioned between the discs and in the recesses. A means is provided of applying force against the rearward-most thrust imparting disc. In the preferred arrangement the rearward portion of the cylindrical opening is internally threaded and an externally threaded compression screw is received in the threaded opening. The inner end of the screw engages the thrust discs by way of electrical contact washers as the member is threadably advanced, forcing the crystal element into contact with the acoustic window rearward face. The thrust/transmitting sphere allows application of force so that defects arising from machining tolerances in the device are compensated for, and thereby the thrust is equally applied to the full rearward face of the crystal element to achieve maximum effective force distribution of the crystal element forward face against the acoustic window rearward face.

The invention also provides improved means of providing electrical connection of conductors between the crystal forward and rearward faces so that electrical energy may be effectively coupled to or received from the crystal element.

In addition to the requirements that the crystal must be securely held in contact with the rearward face of the acoustic window, in order for a transducer to be reliably used in both high temperature and high pressure situations, consideration must be given to two important factors; that is, the method of physically mounting the transducer in the structure with which it is used, such as a plastic extruder, and for the efficient transmission of sound through the acoustic window. Addressing the latter requirement first, an important aspect of the present invention is the construction of a transducer for high pressure application in which the sonic window is critically dimensioned. In order to withstand high pressures the sonic window of this invention is made of metal and is of a critical thickness. That thickness is defined as $N \times \frac{1}{2}$ the speed of sound transmission of sound in the metal of which the transducer is made at the frequency of the crystal; where N is a whole number and is the minimum whole number producing a thickness of the acoustic window which will withstand the pressure which the transducer is to be subjected.

In order for the transducer to function properly, it must be removably seated in the structure with which it is used, such as a plastic extruder, in such a way that under high pressures the plastic material or other liquid through which sound is to be transmitted for measurement purposes, does not leak past the transducer. In the present invention the transducer is received in an opening in the structure which opening extends from exterior of the structure to a liquid conducting passageway. The opening in the structure has a smaller internal diameter portion adjacent the fluid passageway and a larger internal diameter and internally threaded portion adjacent the exterior of the structure. At the transition of these two diameters a frusto-conical sealing surface is formed.

The high pressure transducer includes a relatively short tubular housing having an inner end and an outer end, a sonic window being placed at the inner end, the sonic window forming a part of the wall of the passageway formed in the structure through which liquid is conducted. The exterior of the transducer housing has an enlarged external diameter integral portion which conforms to the sealing surface of the opening in the structure. The external diameter of the transducer housing adjacent the outer end is reduced in external diameter and is non-threaded.

The transducer housing is inserted into the opening in the structure and is retained in such position by an elongated tubular retention member which has an internal diameter to telescopically receive the outer portion of the transducer housing. The inner end of the retention member engages the external ledge on the transducer housing. External threads on the inner end of the retention member engage the threaded opening in the structure so that the transducer housing may be held against rotatable and securely locked in position in the structure by rotation of the retention member. The arrangement thus provides a transducer which can be utilized in high pressure locations wherein the transducer housing does not have to be rotated into position. The rotation of metal against metal frequently causes galling and distortion. The present invention provides a means whereby secure leak-proof fit of the transducer housing with the structure in which it is used is attained without the need to rotate the transducer housing.

For additional background information and for examples of sonic transducers of the type to which the present invention applies, reference may be had to the following U.S. Pat. Nos. 3,771,117; 3,890,423; 3,935,484; 3,973,152; 4,240,004; 4,331,025; and 4,365,518.

DESCRIPTION OF THE DRAWINGS

FIG. 4 is a cross-sectional view as in FIG. 3 but showing an alternate and a more preferred embodiment of the invention.

FIG. 5 is an enlarged cross-sectional view of the inner end of the transducer of FIG. 4 showing the internal construction of the transducer in greater detail and showing the transducer mounted in an opening in a structure in which it is used, such as in a plastic extruder.

DETAILED DESCRIPTION

Figure 1:
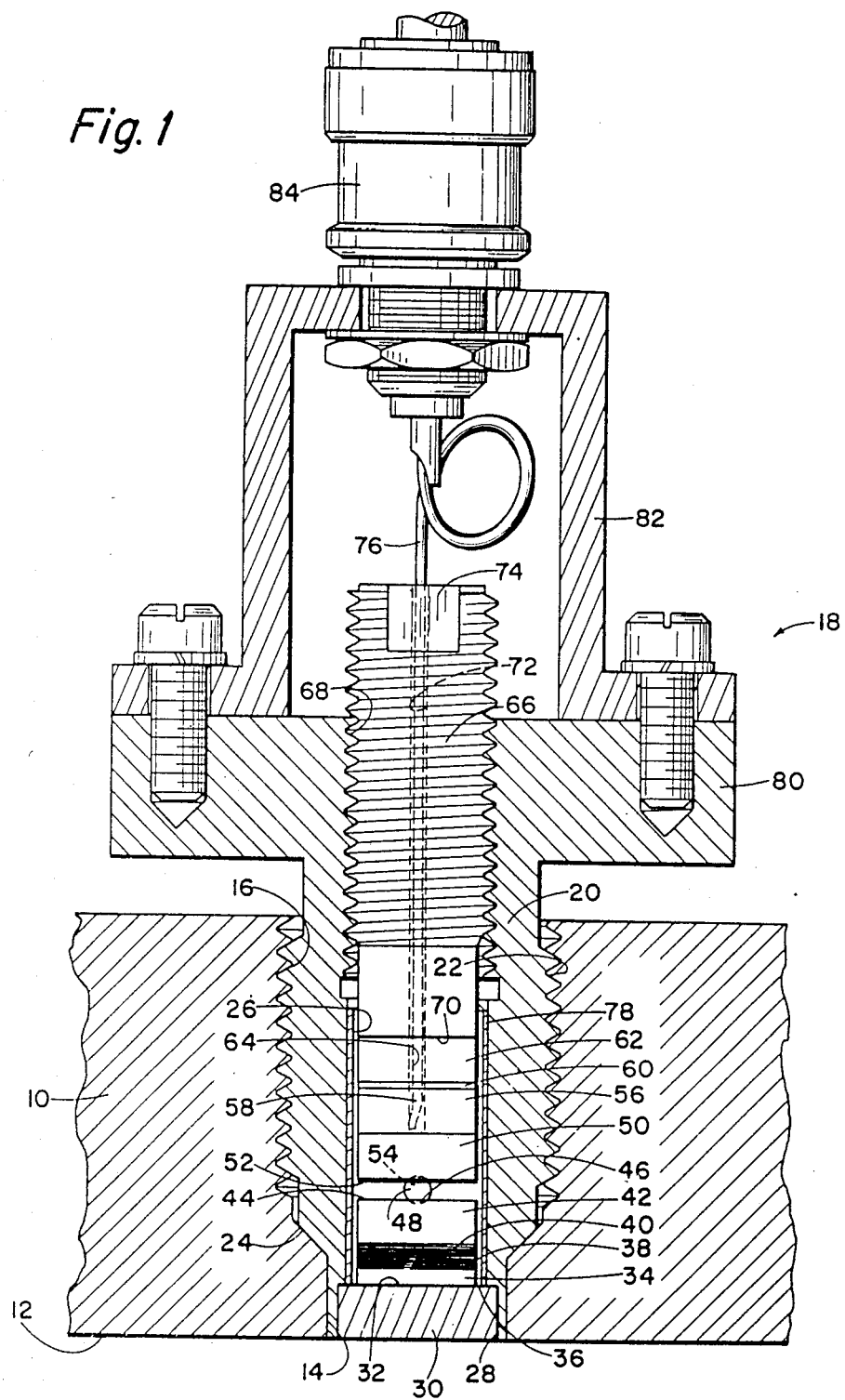
FIG. 1 is a cross-sectional view of one embodiment of the invention in which the transducer housing is received in an internally threaded opening formed in a device, such as a plastic extruder. The transducer housing is provided with a removable bonnet for the attachment of an electrical connector to the transducer.

Referring now to the drawings and first to FIG. 1, an embodiment of the invention is illustrated. The invention, as has been previously mentioned, may be employed such as in monitoring molten plastic as it flows through an extruder; and in such application, the extruder housing is indicated by the numeral 10 with the flow passageway for the liquid plastic indicated by the numeral 12. The housing 10 has an opening 14 which communicates with the flow passageway 12, the outward portion of the opening 14 being of enlarged internal diameter and threaded at 16. The transducer is generally indicated by the numeral 18 which includes a cylindrical body 20 having external threads 22. The exterior configuration of the transducer body 20 is configured to sealably engage the opening 14 in housing 10, including the provision of an internal shoulder 24.

Body 20 has a cylindrical opening 26 which receives the elements making up the operative part of the transducer. The inward end of cylindrical opening 26 is of enlarged diameter at 28 and receives an acoustic window element 30. The element 30 is formed of material which is highly conductive of sonic energy, such as of metal. In addition, the acoustic window 30 must withstand the high temperatures and high pressures to which the housing 10 is subjected, such as is encountered when the device is used to monitor molten plastics flowing through passageway 12. The acoustic window 30 is preferably welded in position in opening 28 to thereby form a sealed closure of the lower end of the interior of cylindrical opening 26.

The acoustic window 30 has a planar rearward surface 32. Positioned in contact with this surface is a cylindrical transducer crystal element 34 having a forward planar surface 36 and a rearward planar surface 38. It is extremely important that the crystal element forward surface 36 have intimate contact with the acoustic window rearward surface 32 in order to achieve efficient acoustic coupling of these two elements. The pressure of contact of these surfaces must not only be such as to eliminate the possibility of voids but the pressure needs to be evenly distributed over the entire surface areas. An important aspect of this invention is the provision of means to achieve such equal pressure distribution.

The next element in the assembly is a cylindrical dampening member 40. While the dampening members of a variety of materials and configurations have been employed in transducers, an effective dampening means is the use of a plurality of thin discs of metal such as brass or copper. In a typical embodiment, the dampening member 40 may be made up of approximately 20 thin metal discs.

Rearwardly of the dampening member is a first thrust disc 42 which has, on its rearward surface 44, a small diameter recess 46, the recess being coincident with the cylindrical axis of the disc.

Next is a thrust transmitting sphere 48 which is formed of very hard electrically conductive material, as INCONEL 625 high-temperature alloy, "INCONEL" being a trademark of International Nickel Company. A second thrust disc 50 is of the same configuration as first thrust disc 42, that is, in its forward face 52 there is a small diameter recess 54 coincident with the disc cylindrical axis, the recess 54 receiving the thrust transmitting sphere 48.

Rearwardly of the second thrust disc 50 is an electrical contact washer 56 having an axial opening 58 therethrough. In contact with the rearward surface of the electrical contact washer 56 is an insulator 60 which may be formed of material such as mica or other material which can withstand the temperature to which the transducer is subjected.

Contacting the insulator is a second washer 62 having an axial opening 64 therethrough. Rearwardly of the washer 62 is an externally threaded compression screw member 66. This member is received in the upper internally threaded portion 68 of the cylindrical opening 26 in transducer body 20. The lower end face 70 of the compression screw engages washer 62, the end face being perpendicular the longitudinal axis of the compression screw. An axial opening 72 extends through the compression screw. A wrench flat 74 is formed on the exterior outer end to afford means of rotation of the screw. Received in the axial openings provided in elements 56, 60, 62, and 66 is an insulated conductor 76. The bare or exposed end of the insulated conductor is attached to the electrical contact washer 56. Received within the cylindrical opening 26 in the transducer body is a tubular insulating member 78. Conductor 76 thereby provides an electrical path to the rearward surface 38 of the crystal element 34.

Formed integrally as a part of the outer end of the body 20 is a flange portion 80 which receives a cylindrical bonnet member 82. An electrical connector 84 is attached to the bonnet portion and provides means for connecting a cable having continuity with the insulated conductor 76. The purpose of the bonnet portion 82 is to afford means of attaching an electrical connector at sufficient spacing so as to reduce the possibility of overheating of the electrical connector 84.

As previously indicated, it is extremely important that the pressure contact of the crystal element 34 with the acoustic window 30 be maintained at all temperatures to which the transducer is subjected. This is accomplished by inwardly threading the compression screw 66. The force applied by the compression screw is transmitted through the washer 62, insulator 60, electrical contact washer 56, second thrust disc 50, thrust transmitting sphere 48, first thrust disc 42, and dampening member 40 to the crystal element 34. Any misalignment or machining tolerances in manufacturing the various elements making up the transducer are compensated for by the thrust transmitting sphere 48. In this manner the pressure applied against the crystal member rearward surface 38 is transmitted evenly over the entire area of the crystal forward surface 36 and acoustic window rearward surface 32. It should also be noted that the force is transmitted throughout in a linear path and with only a single force adjustment which is accomplished by the rotation of compression screw 66.

Figure 2:
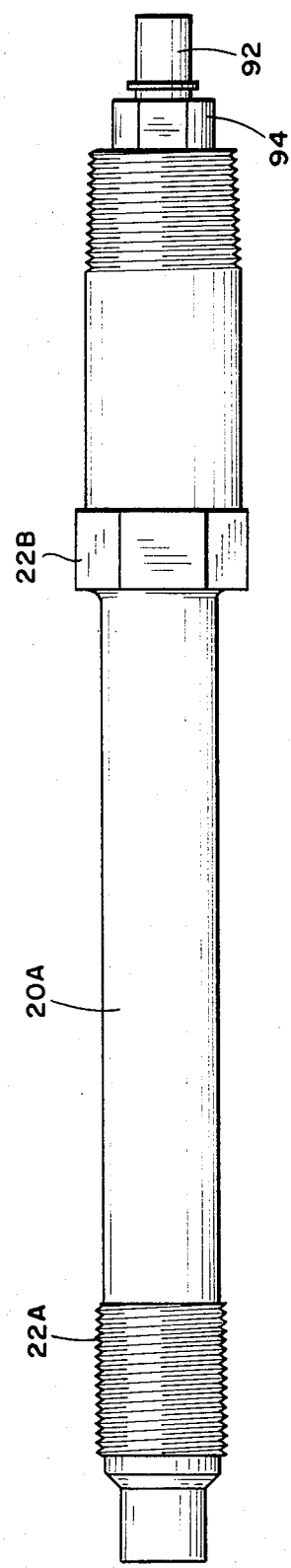
FIG. 2 is an external elevational view of an embodiment of the invention particularly adaptable to high pressure applications.
Figure 3:
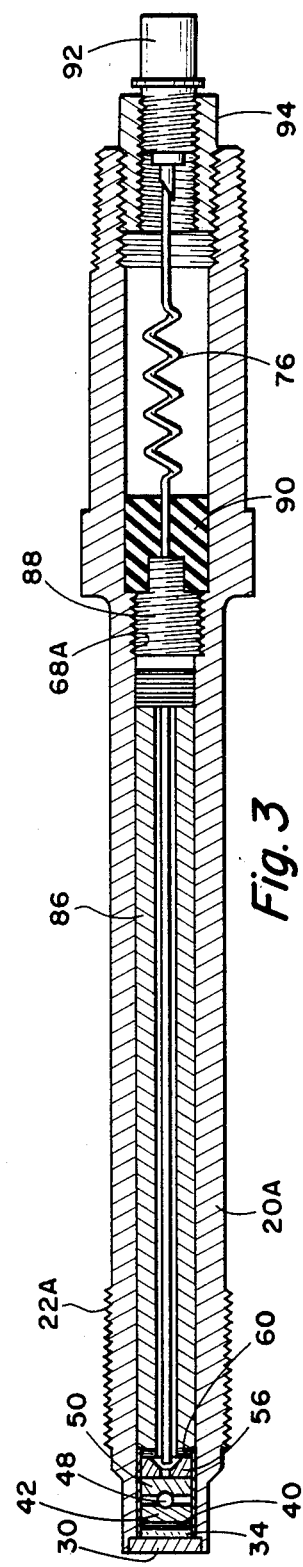
FIG. 3 is a cross-sectional view of the transducer of FIG. 2.

Referring now to FIGS. 2 and 3 another embodiment of the invention is illustrated. In FIGS. 2 and 3 the transistor body 20A is of a different shape but serves the same function as the transducer body previously described. Body 20A has external threads 22A by which it is positioned in an opening in an apparatus with which it is used, such as a plastic extruder. The body has hexagonal external configuration at 22B whereby it can be easily threaded into an internally threaded opening in a structure.

As shown particularly in FIG. 3, the internal threads 68A are spaced at some distance from the elements making up the active part of the transducer. An elongated tubular force transmitter 86 engages, at its inner end, the electrical insulating washer 60. A threaded plug 88 is received in internal threads 68A and, when tightened, applies force against tubular member 68 to urge the elements 40, 42, 48, 50, 56 and 60 into compression to thereby insure pressure contact between crystal 34 and the rearward surface of the acoustic window 30. After plug 86 is tightened a sealing compound 90 is poured into the upper open end of the tubular transducer body to maintain the plug in a non-rotatable position and at the same time to seal the interior of the transducer against contamination.

A conductor 76 is affixed at its inner end to the electrical contact washer 56 and extends to electrical receptacle 92 retained within an internally and externally threaded collar 94. Conductor 76 affords continuity with the rearward surface of crystal 34. The forward surface of the crystal is electrically connected to the metallic acoustic window 30 and hence to the transducer body 20A so that the second electrical path is ground; that is, through the body of the transducer.

The arrangement of FIGS. 2 and 3 merely exemplify the fact that the high pressure, high temperature transducer of FIG. 1 may take on various physical arrangements while keeping within the spirit and scope of this invention.

FIGS. 4 and 5 show an alternate and a preferred arrangement for a high pressure high temperature transducer. In this embodiment the transducer body is completely different and is indicated by the numeral 96. The transducer body 96 is of relatively short tubular configuration having an internal opening 98 which receives the elements making up the working components of the transducer. These elements include the acoustic window 30, crystal 34, dampening member 40, first thrust disc 42, thrust transmitting sphear 48, second thrust disc 50, electrical contact washer 56, insulating washer 60 and tubular insulating members 78 as previously described. The electrical contact washer 56 has an internal opening 58 providing means to accept the conductor portion of a cable 56 which extends to an electrical fitting 100 by which electrical signals can be transmitted to and received from the transducer. Only a single conductor is required in cable 76, the other current path being through the body of the transducer.

FIG. 5 shows the structure 10 in which the transducer is retained, the structure being such as a plastic extruder, the structure having an opening 100 which is configured to provide a frusto-conical seating surface 102 and an enlarged internally threaded portion 104. The opening 100 extends from exterior of structure 10 to a flow passageway 12 through which fluid flows, such as plastic in molten or semi-melted state.

The transducer body 96 is configured to be slideably received in opening 100 and includes an inner cylindrical portion 106 and an enlarged diameter integral flange portion 108 providing a frusto-conical seat 110 which matches in configuration the seating surface 102. The transducer body has a reduced external diameter cylindrical portion 112 adjacent the body outer end providing a radial flange surface 114.

The transducer body 96 has an inner end 96A and an outer end 96B and an internally threaded portion 116 adjacent the outer end 96B.

Received within the transducer body is a tubular thrust member 118 having, adjacent the outer end, external threads 120 which engage the body internal threads 116. Thrust member 118 has a tubular opening 122 therethrough which, adjacent the outer end, is configured such as by an internal square or hex 124 adaptable to receive an allen-type wrench by which the thrust member may be threadably advanced within the transistor body to compress the components necessary to force the crystal 40 into firm contact with the rearward surface of acoustic window 30. Thrust washers 126 convey force from the inner end of the thrust member to the electrical contact washer 56 and from thence to the other thrust imparting portions of the device as previously described. At least one of the thrust washers 126 is formed of insulating material, such as mica.

An elongated tubular outer housing 128 is employed to retain the transducer body 96 in position. The outer housing 128 has an internal diameter 130 so that it telescopically extends over the outer cylindrical portion 112 of the transducer body, the outer housing inner end 128A engages the transducer body radial flange surface 114. External threads 132 adjacent the inner end 128A are received in the structure threaded opening 104. By torque applied to the outer housing the transducer body is secured in leak proof fashion within the structure. To facilitate the threaded position of the outer housing, an exterior portion adjacent the outer end 128B is provided with a hexagonal external configuration 134 to receive a wrench. The outer housing exterior surface adjacent the outer end 128B is provided with external threads 136 to receive a protective cover (not shown).

Positioned within the outer housing is a tubular stem 138. The inner end of the stem is externally threaded at 140 and is received in the internal threads 116 and the transducer body. To prevent the stem from becoming unthreaded from the transducer body a key 142 is placed through aligned openings in the body and the stem before the outer housing is positioned over the stem and the transducer body. An internal opening 144 of the stem receives conductor 76 and is internally threaded at its upper ends to receive an electrical fitting 100 to facilitate making electrical connections with the transducer.

The arrangement of FIGS. 4 and 5 provides a transducer having particular application for high pressure, as well as high temperature applications. In the normal application of a transducer wherein the body is threaded into position such as in FIGS. 1, 2 and 3, there is a tendency for galling action to take place which can damage the seal formed between the structure conical seat 102 and the transducer seat 110. With the arrangement of FIGS. 4 and 5 the transducer body is inserted into the opening employing stem 138. Then the outer housing 128 is inserted over the stem and the body and threaded into position in threaded opening 104 in the structure. Torque can be applied to the outer housing 128 as necessary and to prevent the transducer body from being rotated as torque is applied to the outer housing stem 138 can be held against rotation by wrench applied to the outer end. In this manner, the maximum force necessary to assure a leak-proof seal of the transducer housing with the structure can be achieved without rotating the housing relative to the structure.

When a transducer is employed in a high pressure application the acoustic window 30 is subjected to the full pressure of fluid flowing through passageways 12 since the outer surface of the acoustic window forms a part of the flow passageway. It is therefore imperative that the acoustic window be as strong as necessary to resist deformation. A problem exists however in that the sonic energy transmitted and received by crystal 40 must pass through the acoustic window. An important principle of this invention is the method of determining the thickness D of the acoustic window.

For high pressure applications the acoustic window 30 is preferably formed of a high strength metal such as titanium. A very critical dimension is the thickness D of the acoustic window. Important to this invention is the feature that for a high pressure transducer the thickness D should be $N \times \frac{1}{2}$ the wave length of acoustic energy in the window, where N is a whole number which produces the minimum thickness necessary to resist the pressure to which the transducer will be subjected. As an example, assume that crystal 40 is configured to produce a frequency of 2MHZ. The calculation of the speed of sound transmission in titanium indicates that $\frac{1}{2}$ of a wave length equal about 0.12 inch; that is, the thickness D should be 0.12 inch as a minimum thickness if such thickness is sufficient according to the pressure to which the transducer is to be subjected. If the outside diameter of the acoustic window is approximately 0.5 inch a titanium acoustic window of 0.12 inch thick will resist deformation up to a predeterminable pounds per square inch (psi). If the pressure to which the transducer is to be submitted is greater than this amount, and if the diameter is to remain the same and the frequency the same, then the thickness D should be increased as a multiple of 0.12 inch; that is, such as 0.24 inch, 0.36 inch etc. If the frequency changes, or if the metal of which acoustic window is constructed changes so that it has a different speed of sound transmission characteristics, then the computation of the thickness of the transducer window will correspondingly change.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A transducer for transmitting and/or receiving sonic energy in a high pressure environment, comprising:

a housing having a cylindrical opening having a forward end and rearward end;

a cylindrical transducer crystal element having a forward planar face and an opposed rearward face, the crystal element having a natural frequency of deformation when electrically stimulated;

a sonic window member sealably closing the forward end of said housing cylindrical opening, the sonic window being of thickness of about N times $\frac{1}{2}$ the wavelength of sound in the window at the frequency of said crystal element where N is a whole number and is the minimum number to provide a sonic window of strength capable of resisting the force against it according to the environment in which the transducer is used;

means in said cylindrical opening rearwardy of said crystal element for applying force against said crystal element rearward face to cause intimate contact of said crystal element forward face and said sonic window rearward face; and means of providing separate electrical paths between said crystal element forward and rearward faces.

2. A transducer for high pressure environments according to claim 1 including:

a thrust transmitting sphere in the path of said applied force serving to ensure uniform load of force of said crystal element against said window.

3. A transducer for high pressure environments according to claim 2 including a first and a second cylindrical thrust imparting disc, each disc having a recess in one surface of its cylindrical axis, said discs being positioned within said cylindrical opening between said force applying means and said transducer crystal element with their axes in the path of force applied by said means and said thrust transmitting sphere being positioned between the discs and received in the recesses therein.

4. A transducer for high pressure environments according to claim 1 including:
a cylindrical dampening member rearwardly of said crystal element and in contact with said rearward face thereof, said dampening member being in the path of said applied force against said crystal element.

5. A transducer for high pressure environments according to claim 4 wherein said cylindrical dampening member is in the form of a plurality of thin cylindrical discs.

6. A transducer for high pressure environments according to claim 5 wherein said cylindrical discs are formed of non-ferrous metal.

7. A transducer for high pressure environments according to claim 1 including an insulating sleeve within said cylindrical opening surrounding said crystal element and portions of said force applying means having electrical continuity with said crystal element rearward face.

8. A transducer for high pressure environments according to claim 1 including an electrical contact washer within said cylindrical opening and positioned between said crystal element rearward face and said force applying means, the washer having an opening therethrough and said force applying means having a longitudinal opening therein; and
an insulated conductor having one end connected to said electrical contact washer and the other end extending externally of the transducer through said force applying means longitudinal opening.

9. A transducer for high pressure environments according to claim 1 wherein said housing cylindrical opening is internally threaded in the portion adjacent said rearward end and wherein said force applying means is in the form of an externally threaded compression screw threadably received in said cylindrical opening internally threaded rearward end portion.

10. A transducer for high pressure environments according to claim 1 wherein said acoustic window is metallic and is welded in position in said cylindrical opening.

11. A transducer for high pressure environments according to claim 1 in which the transducer is configured for mounting in a structure having an opening therein communicating from the exterior of the structure to a liquid containing cavity, the portion of the opening adjacent the structural exterior being internally threaded and the portion of the opening between the threaded portion and the liquid containing cavity providing a reduced diameter internal seating ledge, and wherein said transducer housing is exteriorly configured adjacent said forward end to sealably seat against said ledge and is of reduced external diameter at the rearward end providing an external ledge, and including:
a tubular retainer having an inner end and an outer end, the inner end being externally threaded and engageable with said structure threaded opening, the retainer having an internal diameter greater than the external diameter of said housing rearwardly of said housing external ledge, the inner end of said retainer engaging said housing external ledge to retain said housing within said structure opening.

12. A transducer for high pressure applications for use in a structure having a passageway therethrough in which material in a liquid or semi-liquid state is conveyed under pressure and the structure having an opening from the exterior to the passageway, the opening being configured to provide a reduced diameter seating surface therein and the opening being internally threaded between said reduced diameter seating surface and the structure exterior, the transducer comprising:
a tubular transducer housing having an inner and outer end and being receivable in the opening in a structure, the housing being externally configured to engage the structure seating surface, the housing being of reduced external diameter at the outer end providing an external ledge;
a metallic acoustic window closing said transducer housing inner end and having a forward and rearward surface, the acoustic window forward surface forming a portion of the passageway in a structure when the transducer is in position in the structure;
a transducer crystal within the housing and in intimate contact with said acoustic window rearward surface;
conductor means for applying and receiving electrical currents to and from said crystal;
a tubular retainer having an inner end and an outer end, the inner end being externally threaded and engageable with said structure threaded opening, the retainer having an internal diameter greater than the external diameter of said housing rearwardly of said housing external ledge, the inner end of said retainer engaging said housing external ledge to retain said housing within said structure opening.

13. A transducer for transmitting and/or receiving sonic energy in a high pressure environment in which the transducer is configured for mounting in a structure having an opening therein communicating from the exterior of the structure to a liquid containing cavity, the portion of the opening adjacent the structural exterior being internally threaded and the portion of the opening between the threaded portion and the liquid containing cavity providing a reduced diameter internal seating ledge, the transducer comprising:
a housing having a cylindrical opening and having a forward end and a rearward end, the transducer housing being externally configured adjacent the forward end to sealably seat against said seating ledge and the housing being of reduced external diameter at the rearward end providing an external ledge;
a cylindrical transducer crystal element having a forward planar face and an opposed rearward face, the crystal element having a natural frequency of deformation when electrically stimulated;
a sonic window member sealably closing the forward end of said housing cylindrical opening;
means in said cylindrical opening rearwardly of said crystal element for applying force against said crystal element rearward face to cause intimate contact of said crystal element forward face and said sonic window;
means of providing separate electrical paths between said crystal element forward and rearward faces; and
a tubular retainer having an inner end and an outer end, the inner end being externally threaded and engageable with said structure threaded opening, the retainer having an internal diameter greater than the external diameter of said housing rearwardly of said housing external ledge, the inner end of said retainer engaging said housing external ledge to retain said housing within said structure opening.

14. A transducer according to claim 13 wherein the sonic window is of thickness of about N times ½ the wavelength of sound in the window at the frequency of said crystal element where N is a whole number and is the minimum number to provide a sonic window of strength capable of resisting the force against it according to the environment in which the transducer is used.

15. A transducer for high pressure environments according to claim 13 including:
a thrust transmitting sphere in the path of said applied force serving to ensure uniform load of force of said crystal element against said window.

16. A transducer for high pressure environments according to claim 15 including a first and a second cylindrical thrust imparting disc, each disc having a recess in one surface of its cylindrical axis, said discs being positioned within said cylindrical opening between said force applying means and said transducer crystal element with their axes in the path of force applied by said means and said thrust transmitting sphere being positioned between the discs and received in the recesses therein.

17. A transducer for high pressure environments according to claim 13 including:
a cylindrical dampening member rearwardly of said crystal element and in contact with said rearward face thereof, said dampening member being in the path of said applied force against said crystal element.

18. A transducer for high pressure environments according to claim 17 wherein said cylindrical dampening member is in the form of a plurality of thin cylindrical discs.

19. A transducer for high pressure environments according to claim 18 wherein said cylindrical discs are formed of nonferrous metal.

20. A transducer for high pressure environments according to claim 18 including an electrical contact washer within said cylindrical opening and positioned between said crystal element rearward face and said discs, the washer having an opening therethrough and said force applying means having a longitudinal opening therein; and
an insulated conductor having one end connected to said electrical contact washer and the other end extending externally of the transducer through said force applying means longitudinal opening.

21. A transducer for high pressure environments according to claim 13 including an insulating sleeve within said cylindrical opening surrounding said crystal element and portions of said force applying means having electrical continuity with said crystal element rearward face.

* * * * *